Sept. 2, 1952           D. VOS           2,609,214

ANTICHAFING TRAILER HITCH

Filed Feb. 8, 1950

Donald Vos
INVENTOR.

Patented Sept. 2, 1952

2,609,214

UNITED STATES PATENT OFFICE 2,609,214

ANTICHAFING TRAILER HITCH

Donald Vos, Pella, Iowa

Application February 8, 1950, Serial No. 143,070

1 Claim. (Cl. 280—33.44)

The invention relates to the class of farm or agricultural machinery, and more particularly anti-chafing harrow hitch adapted to prevent excessive wear on the tires of a tractor vehicle and on the drawbar cable of the trailer vehicle while also affording maximum protection against accidental injury to the tractor operator and damage to the tractor itself.

An object of this invention is to provide anti-chafing roller means adapted to be secured on a drawbar cable whereby excessive wear on the tires of a tractor vehicle wheels will be eliminated when the tractor vehicle is making sharp turns or maneuvers.

Another object of the invention resides in the provision of anti-chafing rollers which are ellipsoidal in shape and which may be readily and easily installed on the drawbar reinforcing cables of a trailer vehicle.

Yet another object of the invention resides in the provision of stop means for limiting the rearward position of the anti-chafing rollers which are secured on the drawbar cable.

Still further objects of the invention reside in the provision of this anti-chafing harrow hitch which comprises anti-chafing rollers that are strong, wide, durable, highly efficient in their operation, simple in construction and design and are capable of being readily and easily replaced, and quite inexpensive.

These, together with the various ancillary objects of the invention which will become apparent as the following description proceeds, are attained by this anti-chafing harrow hitch, a preferred embodiment of which has been illustrated in the accompanying drawings, by way of example, wherein.

Figure 1:
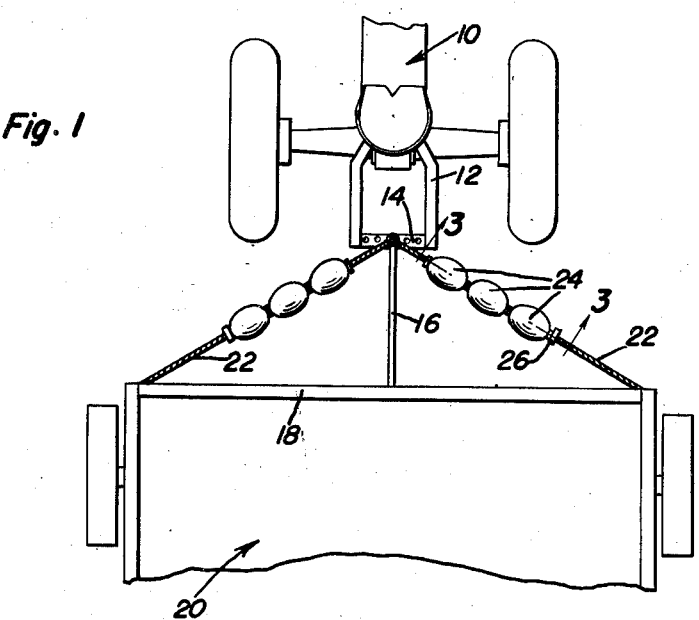
Figure 1 is a plan view showing the invention in operative emplacement on a trailer vehicle being drawn by a tractor vehicle.
Figure 2:
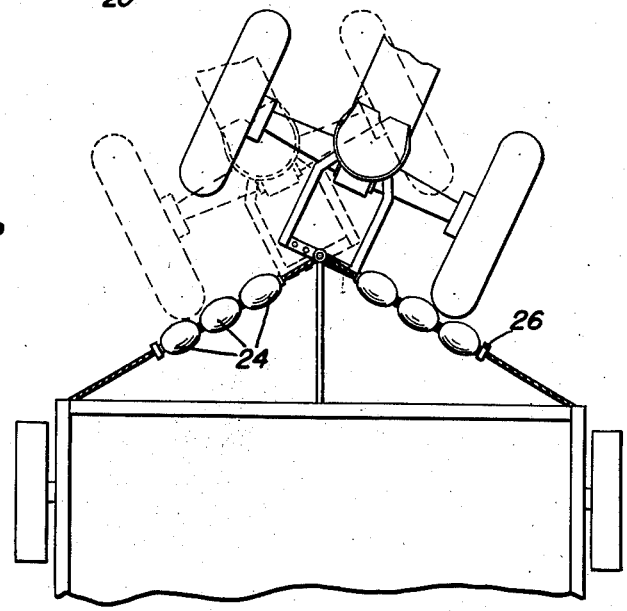
Figure 2 is a view similar to Figure 1 showing the tractor vehicle when making a sharp turn with the tires of the wheels thereof in engagement with the anti-chafing rollers.
Figure 3:
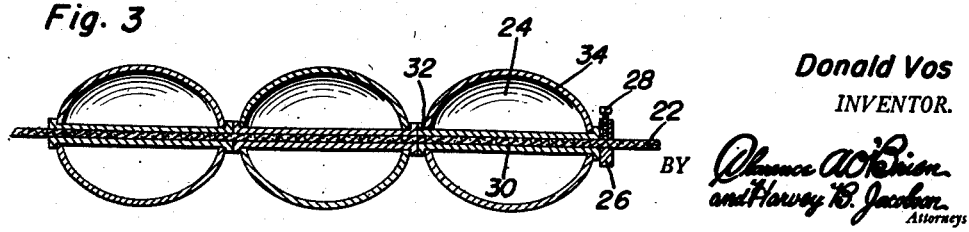
Figure 3 is an enlarged sectional view as taken along line 3—3 in Figure 1.

With continuing reference to the accompanying drawings wherein like reference numerals designate similar parts throughout the various views, reference numeral 10 generally designates a tractor vehicle having a yoke 12 to which a draft bar 14 is secured for selective engagement with the coupling rod 16 which in turn is connected to the drawbar 18 of the trailer vehicle generally designated by reference numeral 20 which may be a harrow or other similar farm machinery.

Terminally connected to the draft bar 18 and to the coupling rod 16 are cables 22 which reinforce and strengthen the coupling rod 16. However, when the tractor vehicle 10 makes a sharp turn the tires on the wheels will engage and override the cables 22 to the damage both of the cables and of the tires. In order to eliminate this wear a plurality of anti-chafing elements 24 are rotatably secured on the cable 22 with the rearwardmost position thereof being limited by stop plate 26 which is of preferably circular shape having a set screw or thumb screw 28 threadedly engaged therein for contact with the cable 22.

Each of the elements 24 comprise tubular members 30 formed with annular flanges 32 at the ends thereof forming shoulders for abutting engagement with the next adjacent anti-chafing element. A hollow ellipsoidal perforated member 34 is welded or elsewise secured about the tubular members 30. The ellipsoidal surface of these members is highly preferable since their continuously change in curvature thereof will tend to cause but single point contact with the tires. Since this contact is continuously rolling contact very little wear will be caused to the tires or the roller elements.

Since from the foregoing the construction and advantages of this harrow hitch are readily apparent, further description is believed unnecessary.

However, since numerous modifications will readily occur to those skilled in the art after a consideration of the foregoing specification and accompanying drawings, it is not intended to limit the invention to the precise embodiments shown and described but all suitable modifications and equivalents which may be resorted to which fall within the scope of the appended claim.

Having described the invention, what is claimed as new is:

In a trailer vehicle having a drawbar and a coupling member secured to said drawbar and adapted to be detachably secured to a draft bar on a tractor vehicle, the improvement consisting of an anti-chafing means comprising roller elements rotatably secured on a cable, said cable being terminally secured to said drawbar and said coupling member, said roller elements comprising a plurality of adjacent tubular members freely rotatably on said cable, and an ellipsoidal shaped member secured to each of said tubular members, and stop means engaging said cable limiting the position of said tubular members, said stop means comprising a stop member having screw means threadedly mounted therein for selective engagement with said cable.

DONALD VOS.

REFERENCES CITED

The following references are of record in the file of this patent:

UNITED STATES PATENTS

| Number | Name | Date |
|---|---|---|
| 349,247 | Black | Sept. 14, 1886 |
| 793,500 | Baker | June 27, 1905 |
| 1,074,213 | Schubert | Sept. 30, 1913 |
| 1,599,923 | Reuber | Sept. 4, 1926 |
| 1,721,694 | Graham | July 23, 1929 |
| 1,732,989 | Scrabeck | Oct. 22, 1929 |